US012601701B2

(12) United States Patent
Potyrailo et al.

(10) Patent No.: US 12,601,701 B2
(45) Date of Patent: Apr. 14, 2026

(54) MULTI-FREQUENCY SENSING SYSTEM AND METHOD

(71) Applicant: General Electric Company, Schenectady, NY (US)

(72) Inventors: Radislav Alexandrovich Potyrailo, Niskayuna, NY (US); Shiyao Shan, Clifton Park, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 465 days.

(21) Appl. No.: 17/969,428

(22) Filed: Oct. 19, 2022

(65) Prior Publication Data

US 2024/0133837 A1 Apr. 25, 2024
US 2024/0230575 A9 Jul. 11, 2024

(51) Int. Cl.
G01N 27/22 (2006.01)

(52) U.S. Cl.
CPC ......... G01N 27/228 (2013.01); G01N 27/227 (2013.01)

(58) Field of Classification Search
CPC ........ G01N 27/00; G01N 27/02; G01N 27/22; G01N 27/228; G01N 27/227; G01N 27/4045; G01N 27/407; G01N 27/026; G01N 33/00; G01N 35/00; G01N 27/4114; G01N 33/0004; G01N 33/0009; G01N 33/0016; G01N 33/0027; G01N 33/0031; G01N 33/0036; G01N 33/0037; G01N 33/0039; G01N 33/004; G01N 33/0042; G01N 33/0044; G01N 33/0045; G01N 33/0047; G01N 33/0049; G01N 33/005;

(Continued)

(56) References Cited

U.S. PATENT DOCUMENTS

| | | | |
|---|---|---|---|
| 6,235,243 | B1 | 5/2001 | Fleischer et al. |
| 6,960,476 | B2 | 11/2005 | Morris |
| 11,428,658 | B2 | 8/2022 | Carbonelli et al. |

(Continued)

FOREIGN PATENT DOCUMENTS

JP 5884914 B2 * 3/2016 ............. G01N 21/27

OTHER PUBLICATIONS

U.S. Appl. No. 17/859,874, filed Jul. 7, 2022, Radislav Alexandrovich Potyrailo.

(Continued)

*Primary Examiner* — Catherine T. Rastovski
*Assistant Examiner* — Matthew W. Baca
(74) *Attorney, Agent, or Firm* — Fletcher Yoder, P.C.

(57) ABSTRACT

A sensor system is described with improved measurement accuracy that is achieved by reducing noise, baseline drift, or both based on processing a group of sensor element response signals. The response signals may be received in response to providing stimuli to the sensor element using different excitation frequencies over time. For example, the sensor circuitry may provide excitation signals to the sensing element with multiple excitation frequencies over time. The sensor system may include storage and processing circuitry to receive the response signals and to generate the correction values based on analyzing the received response signals. The sensor system may then provide adjusted response signals by reducing the noise, baseline drift, or both based on the correction values.

20 Claims, 7 Drawing Sheets

(58) Field of Classification Search
CPC ........... G01N 33/0052; G01N 33/0054; G01N 33/0055; G01N 33/0057
See application file for complete search history.

(56) References Cited

U.S. PATENT DOCUMENTS

| | | | |
|---|---|---|---|
| 2004/0026268 A1 | 2/2004 | Maki et al. | |
| 2010/0322471 A1* | 12/2010 | Treado ................. | G01N 21/359 |
| | | | 382/103 |
| 2012/0116683 A1 | 5/2012 | Potyrailo et al. | |
| 2017/0367583 A1* | 12/2017 | Black ................... | A61B 5/7267 |
| 2020/0292480 A1 | 9/2020 | Chrimes et al. | |
| 2020/0386701 A1* | 12/2020 | Potyrailo ............. | G01N 27/122 |
| 2020/0386728 A1* | 12/2020 | Potyrailo ............. | G01N 31/223 |
| 2021/0278384 A1 | 9/2021 | Potyrailo et al. | |
| 2022/0011283 A1 | 1/2022 | Carbonelli et al. | |

OTHER PUBLICATIONS

International Search Report & Written opinion for PCT Application No. PCT/US2023/035522, Mailed Jul. 8, 2024, 10 Pages.
Laref et al., "Orthogonal Signal Correction to Improve Stability Regression Model in Gas Sensor Systems," Aug. 1, 2017, vol. 17, Hindawi, Journal of Sensors, 8 Pages.

* cited by examiner 114              114

114

114

114

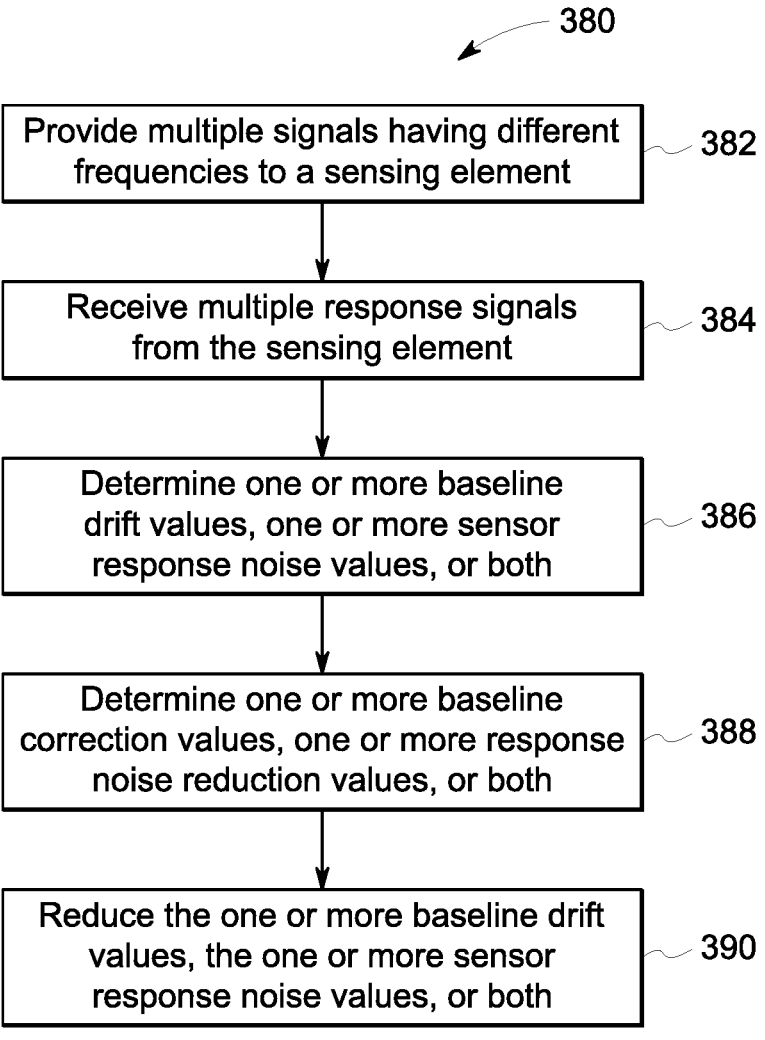

380

Provide multiple signals having different frequencies to a sensing element — 382

Receive multiple response signals from the sensing element — 384

Determine one or more baseline drift values, one or more sensor response noise values, or both — 386

Determine one or more baseline correction values, one or more response noise reduction values, or both — 388

Reduce the one or more baseline drift values, the one or more sensor response noise values, or both — 390

FIG. 6

MULTI-FREQUENCY SENSING SYSTEM AND METHOD

GOVERNMENT LICENSE RIGHTS

This invention was made with government support under contract W15QKN-18-9-1004 awarded by the ACC-NJ to the CWMD Consortium. The government has certain rights in the invention.

FIELD

One or more embodiments are disclosed that relate to systems and methods for sensing gases.

BACKGROUND

Gas sensors may be based on sensing materials that include metal oxide semiconductor (MOS) materials, dielectric polymers, conducting polymers, nanotubes, metal organic frameworks, graphene, supramolecular compounds, and some others.

Conventional MOS sensors have a relatively narrow dynamic range of measurements due to the nature of the interaction mechanisms of MOS sensing materials with the ambient environment. While MOS materials may have commercial success because of their broad applications for gas alarms in residential and industrial facilities, the readout of MOS materials is conventionally performed by measuring resistance change of the material as a function of gas concentration. Such a relationship follows a well-known power law, with saturation of sensor response occurring at high concentrations. Conventional single-output sensors measuring values and/or induced changes on resistance, capacitance, electrical current, light intensity, and other changes of a single output are known as zero-order analytical instruments.

BRIEF DESCRIPTION

In one or more embodiments, a sensor system including a sensing element, a controller, and an excitation/detection system is described. The controller may provide one or more control signals to monitor at least one component in a fluid. The excitation/detection system may be coupled to the sensing element and the controller. The excitation/detection system may perform one or more operations based on the one or more control signals. The operations may include providing a plurality of stimulus signals to the sensing element, wherein the excitation/detection system is configured to provide each stimulus signal of the plurality of stimulus signals with a different frequency within a frequency range to the sensing element, receiving a plurality of sensor responses from the sensing element in response to providing the plurality of stimulus signals, determining one or more noise values, one or more baseline drift values, or both based on analyzing the plurality of sensor responses, determining at least one noise reduction value, at least one baseline drift reduction value, or both, and reducing at least one noise value of the one or more noise values based on the at least one noise reduction value, at least one baseline drift value based on the baseline drift reduction values, or both.

In another embodiment, a method is provided that includes performing operations by a controller of a sensor system. In accordance with this method, one or more control signals are provided, by a controller of a sensor system, to cause generation of a plurality of stimulus signals, each with a different frequency, to a sensing element of the sensor system. A plurality of sensor responses from the sensing element are received, by the controller, in response to providing the plurality of stimulus signals. One or more noise values, one or more baseline drift values, or both are determined, by the controller, based on analyzing the plurality of sensor responses. At least one noise reduction value, at least one baseline drift reduction value, or both are determined by the controller. At least one noise value of the one or more noise values are reduced, by the controller, based on the at least one noise reduction value and/or at least one baseline drift value is reduced, by the controller, based on the baseline drift reduction values.

In another embodiment, a computer-readable medium is described comprising computer-executable instructions that, when executed, cause a processor associated with a sensor system to perform operations. The operations may include providing one or more control signals to an excitation circuit of a sensor system to generate a plurality of stimulus signals, each with a different frequency, to a sensing element of the sensor system, receiving a plurality of sensor responses from the sensing element in response to providing the plurality of stimulus signals, determining one or more noise values, one or more baseline drift values, or both based on analyzing the plurality of sensor responses, determining at least one noise reduction value, at least one baseline drift reduction value, or both, and reducing at least one noise value of the one or more noise values based on the at least one noise reduction value, at least one baseline drift value based on the baseline drift reduction values, or both.

BRIEF DESCRIPTION OF THE DRAWINGS

FIG. 6 is a process for improving accuracy of the sensor of FIGS. 1, 3, and 4 in accordance with one embodiment;

DETAILED DESCRIPTION

One or more embodiments of the subject matter described herein provide sensing systems and methods that allow for reconfiguration of sensitivity and dynamic range of gas measurements.

Figure 1:
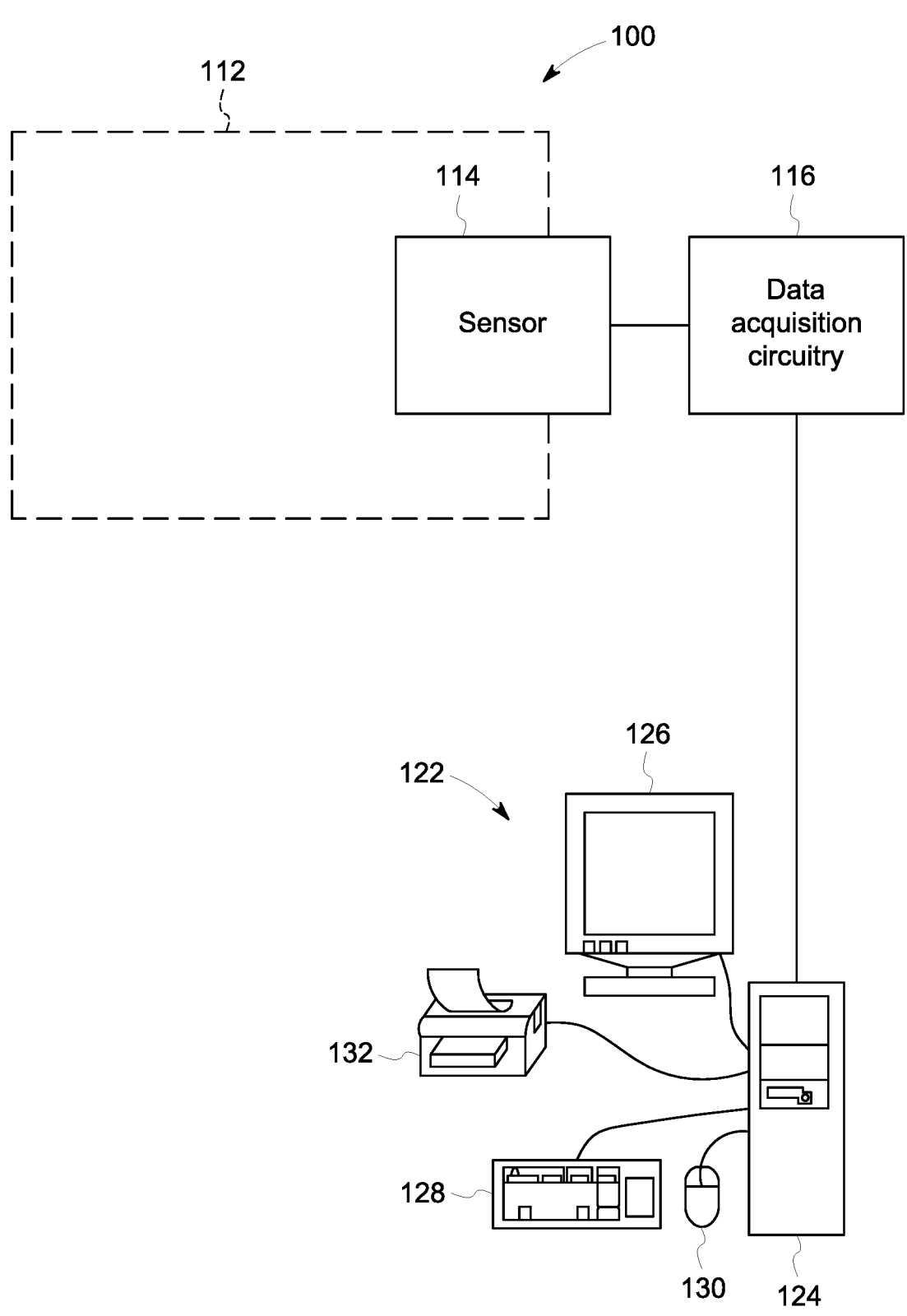
FIG. 1 illustrates one implementation of a sensor system in accordance with one embodiment.

FIG. 1 illustrates one embodiment of a sensor system 100 that may be used to examine a fluid in contact with the system 100. The fluid may be a gas, a liquid, a gas-liquid mixture, particles or particulate matter, or the like, containing one or more analyte gases. In some cases, the sensor system 100 (e.g., a fluid sensor) may continuously and/or in real-time measure concentration of one or more fluids to determine a change in the concentration of the one or more fluids. The sensor system 100 may convert such measurement into analytically useful signals for continuous monitoring of at least one component in a fluid.

The fluid may include indoor or outdoor ambient air. Another example of the fluid is air at an industrial, residential, military, construction, urban, and any other known site. Another example of the fluid is ambient air with relatively various concentrations of hydrocarbons and/or other pollutants. For example, the fluid may include ambient air with relatively small concentrations of benzene, naphthalene, carbon monoxide, ozone, formaldehyde, nitrogen dioxide, sulfur dioxide, ammonia, hydrofluoric acid, hydrochloric acid, phosphine, ethylene oxide, carbon dioxide, hydrogen sulfide, chemical warfare agents such as nerve, blister, blood, and choking agents, hydrocarbons and/or other pollutants. Another example of the fluid is a disinfection agent, such as alcohol, aldehyde, chlorine dioxide, hydrogen peroxide. Another example of the fluid is ambient air with relatively small concentrations, medium concentrations, and large concentrations of flammable or combustible gases such as methane, ethane, propane, butane, hydrogen, and/or other gases.

In certain embodiments, the fluid may include analyte gases that are indoor pollutants. A non-limiting list of example indoor pollutants includes, but is not limited to: acetaldehyde, formaldehyde, 1,3-butadiene, benzene, chloroform, methylene chloride, 1,4-dichlorobenzene, perchloroethylene, trichloroethylene, naphthalene, and polycyclic aromatic compounds. In certain embodiments, the fluid may include analyte gases that are outdoor pollutants. A non-limiting list of example outdoor pollutants includes, but is not limited to: ozone, nitrogen dioxide, sulfur dioxide, and carbon monoxide.

Another example of the fluid is at least one gas dissolved in an industrial liquid such as transformer oil, bioprocess media, fermentation media, wastewater, and/or any other media, gas, or liquid. Another example of the fluid is the at least one gas dissolved in a consumer liquid such as milk, non-alcoholic beverages, alcoholic beverages, cosmetics, and any other. Another example of the fluid is the at least one gas dissolved in a consumer liquid such as milk, non-alcoholic beverages, alcoholic beverages, cosmetics, and any other. Another example of the fluid is at least one gas (e.g., a biomarker) dissolved in a body liquid such as blood, sweat, tears, saliva, urine, and any other.

Another example of the fluid is at least one gas dissolved in a body liquid such as blood, sweat, tears, saliva, urine, and so forth. Another example of the fluid is transformer oil or any insulating fluid of an electrical transformer that is installed and/or disposed below a ground level, above the ground level, near to the ground level, or at any other position. In another embodiment, the fluid may be a gas or fuel, such as a hydrocarbon-based fuel. One example of the fluid is natural gas that is supplied to a powered system (e.g., a vehicle, or a stationary generator set) for consumption. Other examples of such a fluid can include gasoline, diesel fuel, jet fuel or kerosene, bio-fuels, petrodiesel-biodiesel fuel blends, natural gas (liquid or compressed), and fuel oils.

In certain embodiments, the fluid may include analyte gases that are toxic industrial materials or toxic industrial chemicals. A non-limiting list of example toxic industrial materials and chemicals includes, but is not limited to: ammonia, arsine, boron trichloride, boron trifluoride, carbon disulfide, chlorine, diborane, ethylene oxide, fluorine, formaldehyde, hydrogen bromide, hydrogen chloride, hydrogen cyanide, hydrogen fluoride, hydrogen sulfide, nitric acid (fuming), phosgene, phosphorus trichloride, sulfur dioxide, sulfuric acid, and tungsten hexafluoride. In certain embodiments, the fluid may include analyte gases that are toxic materials of the medium Hazard Index.

A non-limiting list of example toxic materials of the medium Hazard Index includes, but is not limited to: acetone cyanohydrin, acrolein, acrylonitrile, allyl alcohol, allylamine, allyl chlorocarbonate, boron tribromide, carbon monoxide, carbonyl sulfide, chloroacetone, chloroacetonitrile, chlorosulfonic acid, diketene, 1,2-dimethylhydrazine, ethylene dibromide, hydrogen selenide, methanesulfonyl chloride, methyl bromide, methyl chloroformate, methyl chlorosilane, methyl hydrazine, methyl isocyanate, methyl mercaptan, nitrogen dioxide, phosphine, phosphorus oxychloride, phosphorus pentafluoride, selenium hexafluoride, silicon tetrafluoride, stibine, sulfur trioxide, sulfuryl chloride, sulfuryl fluoride, tellurium hexafluoride, n-octyl mercaptan, titanium tetrachloride, trichloroacetyl chloride, and trifluoroacetyl chloride.

In certain embodiments, the fluid may include analyte gases that are toxic materials of the low Hazard Index. A non-limiting list of example toxic materials of the low Hazard Index includes, but is not limited to: allyl isothiocyanate, arsenic trichloride, bromine, bromine chloride, bromine pentafluoride, bromine trifluoride, carbonyl fluoride, chlorine pentafluoride, chlorine trifluoride, chloroacetaldehyde, chloroacetyl chloride, crotonaldehyde, cyanogen chloride, dimethyl sulfate, diphenylmethane-4,40-diisocyanate, ethyl chloroformate, ethyl chlorothioformate, ethyl phosphonothioic dichloride, ethyl phosphonic dichloride, ethyleneimine, hexachlorocyclopentadiene, hydrogen iodide, iron pentacarbonyl, isobutyl chloroformate, isopropyl chloroformate, isopropyl isocyanate, n-butyl chloroformate, n-butyl isocyanate, nitric oxide, n-propyl chloroformate, parathion, perchloromethyl mercaptan, sec-butyl chloroformate, tert-butyl isocyanate, tetraethyl lead, tetraethyl pyrophosphate, tetramethyl lead, toluene 2,4-diisocyanate, and toluene 2,6-diisocyanate.

The system 100 may include a fluid reservoir 112 for holding the fluid and one multivariable gas sensor 114 at least partially disposed on or within the fluid reservoir 112. Alternatively, the sensor 114 may be set in a flow path of the fluid outside of the reservoir 112, such as coupled to in-line connectors in fluid communication with the fluid reservoir that define a flow path. In any case, the sensor 114 may monitor concentration of one or more components of one or more analyte gases continuously, based on an interval, or upon receiving control signals indicative of gas concentration measurement.

The multivariable gas sensor 114 may provide two or more outputs that are substantially independent of each other. The fluid reservoir 112 may be in a form of a vessel with controlled volume or in a form of an open area such as an indoor facility (e.g., a room, a hall, a house, a school, a hospital, a confined space, or the like), or in the form of an outdoor facility (e.g., a stadium, a gas-production site, a seashore, a forest, or the like). In one embodiment, the sensor 114 may provide continuous monitoring of the fluid within the reservoir or flow path. In one or more embodiments, the sensor 114 may be an impedance gas sensor, an electromagnetic sensor, a photonic sensor, an electronic sensor, a hybrid sensor, or another type of sensor. Optionally, the multivariable gas sensor may be a sensor array.

The sensor 114 may detect characteristics or properties of the fluid via a resonant or non-resonant impedance spectral response. One or more inductor-capacitor-resistor resonant circuits (LCR resonators) may measure the resonant impedance spectral response of the sensor. A non-resonant impedance spectral response is measured when the resistor-capacitor (RC) circuit does not contain an inductor (L). The resonant or non-resonant impedance spectrum of the sensor 114 in proximity to the fluid or in contact with the fluid varies based on sample composition and/or components and/or temperature. The measured resonant or non-resonant impedance values Z' (which may be the real part of impedance, Zre) and Z" (which may be the imaginary part of impedance, Zim) reflect the response of the sensor 114 to the fluid.

Other embodiments of the subject matter described herein include other designs of sensors besides resonant and non-resonant impedance sensors. Other multivariable sensors can be electro-mechanical resonator sensors (e.g., tuning forks, cantilever sensors, acoustic device sensors), thermal sensors, optical sensors, acoustic sensors, photoacoustic sensors, near-infrared sensors, ultraviolet sensors, infrared sensors, visible light sensors, fiber-optic sensors, reflection sensors, or any multivariable sensors. The sensor may generate electrical, electromagnetic, or optical stimuli to measure gas in ambient air at an industrial, residential, military, construction, urban, and any other known site or in measured gas in transformer oil or in isolating fluid. The insulating fluid of an electrical transformer may be insulating oil, mineral oil, synthetic oil, vegetable oil, and any other appropriate insulating fluid.

A stimulus signal (e.g., an electrical or magnetic field) may be applied to a sensing material or sensing film of the sensor 114 via electrodes. The distance between the electrodes and the electrodes' geometry as well as the applied periodic voltage to the electrodes, may define the magnitude of the stimulus signal applied to the sensor 114 (e.g., to the sensing material or film). The electrodes may be in direct contact with the sensing material. For example, the sensor 114 may be a combination of a sensing region and associated circuits and/or the sensing region may be coated with the sensing material. The sensing material may be semiconductor material or metal oxide material.

The sensor 114 may provide the electrical and/or electromagnetic stimuli, hereinafter stimuli, to measure the impedance values of the sensing material. In some cases, the sensor 114 may store the impedance values measured on the sensing material in response to providing the stimuli with different excitation frequencies to the sensing material (e.g., dielectric material). In some embodiments, excitation or dielectric excitation of the sensor 114 (e.g., a metal oxide semiconductor (MOS) sensing material) refers to an alternating current (AC) excitation of the sensor 114 (e.g., the MOS sensing material) at a shoulder of its dielectric relaxation region.

Moreover, impedance of the sensor 114 may be a non-limiting term for any electrical response of the sensing system to an AC current applied to the gas sensing material of the sensor 114. For example, the sensor 114 may determine and/or store the impedance spectrum based on storing the impedance values measured when applying the stimuli with different excitation frequencies. As such, the impedance spectrum may include impedance values of the sensing material of the sensor 114 that are measured in response to providing the stimuli having different excitation frequencies (e.g., a frequency sweep).

Suitable sensors may include single use or multi-use sensors. A suitable multi-use sensor may be a re-usable sensor that may be used during the lifetime of a system in which it is incorporated. In one embodiment, the sensor may be a single use sensor that may be used during all or part of a monitored reaction or process.

Data from the sensor 114 may be acquired via data acquisition circuitry 116, which may be associated with the sensor or which may be associated with a control system, such as a controller or workstation 122 including data processing circuitry, where additional processing and analysis may be performed. The controller 122 may include one or more wireless or wired components, and may also communicate with the other components of the system 100. Suitable communication models include wireless or wired communications. At least one suitable wireless model includes radio frequency devices, such as radio frequency identification (RFID) wireless communications.

Other wireless communication modalities may be used based on application specific parameters. Nonlimiting examples include Bluetooth, LoRa, Wi-Fi, 3G, 4G, 5G, and others. For example, where there may be electromagnetic field (EMF) interference, certain modalities may work where others may not. The data acquisition circuitry 116 optionally can be disposed partially or entirely within the sensor 114. Other suitable locations may include disposition being partially or entirely within the controller 122. Further, the controller 122 can be replaced with a control system of the whole process where the sensor and its data acquisition circuitry may be connected to the control system of the process.

Depending on the design of a sensing material, interrogation of this sensing material may be performed over an appropriate range of frequencies. For example, a sensing material may be a MOS sensing material or a polymeric sensing material where the interrogation of a sensing material may be performed in the radio-frequency or microwave regions of the electromagnetic spectrum. In another example, a sensing material may be a photonic nanostructured iridescent sensing material or a plasmonic nanoparticles sensing material where the interrogation of a sensing material may be performed in the optical region of the electromagnetic spectrum.

The data acquisition circuitry 116 may be in the form of a sensor reader, which may be configured to communicate wirelessly or wired with the sensor 114 and/or the controller 122. For example, the sensor reader may be a battery-operated device and/or may be powered using energy available from the main control system or by using harvesting of energy from ambient sources (light, vibration, heat, or electromagnetic energy).

Additionally, the data acquisition circuitry may receive data from one or more sensors 114 (e.g., multiple sensors positioned at different locations in or around the fluid reservoir). The data may be stored in short term and/or long term memory storage devices, such as archiving communication systems, which may be located within or remote from the system and/or reconstructed and displayed for an operator, such as at the operator workstation. The sensors 114 may be positioned on or in fluid reservoirs, associated piping components, connectors, flow-through components, and any other relevant process components.

The data acquisition circuitry 116 may include one or more processors for analyzing the data received from the sensor 114. For example, the one or more processors may be one or more computer processors, controllers (e.g., microcontrollers), or other logic-based devices that perform operations based on one or more sets of instructions (e.g., software). Moreover, the instructions on which the one or more processors operate may be stored on a tangible and non-transitory computer readable storage medium, such as a memory device. The memory device may include a hard drive, a flash drive, RAM, ROM, EEPROM, and/or the like. Alternatively, one or more of the sets of instructions that direct operations of the one or more processors may be hard-wired into the logic of the one or more processors, such as by being hard-wired logic formed and/or stored in the hardware of the one or more processors.

In addition to displaying the data, the controller 122 may control the above-described operations and functions of the system 100. The controller 122 (e.g., operator work station) may include one or more processor-based components, such as general purpose or application-specific computers or processors 124. In addition to the processor-based components, the computer may include various memory and/or storage components including magnetic and optical mass storage devices, internal memory, such as RAM chips, and so forth. The memory and/or storage components may be used for storing programs and routines for performing the techniques described herein that may be executed by the controller 122 or by associated components of the system 100.

Alternatively, the programs and routines may be stored on a computer accessible storage and/or memory remote from the controller 122 but accessible by network and/or communication interfaces present on the computer 124. The computer 124 may also comprise various input/output (I/O) interfaces, as well as various network or communication interfaces. The various I/O interfaces may allow communication with user interface devices, such as a display 126, keyboard 128, electronic mouse 130, and printer 132, that may be used for viewing and inputting configuration information and/or for operating the imaging system. Other devices, not shown, may be useful for interfacing, such as touchpads, heads up displays, microphones, and the like. The various network and communication interfaces may allow connection to both local and wide area intranets and storage networks as well as the Internet. The various I/O and communication interfaces may utilize wires, lines, or suitable wireless interfaces, as appropriate or desired.

Figure 2:
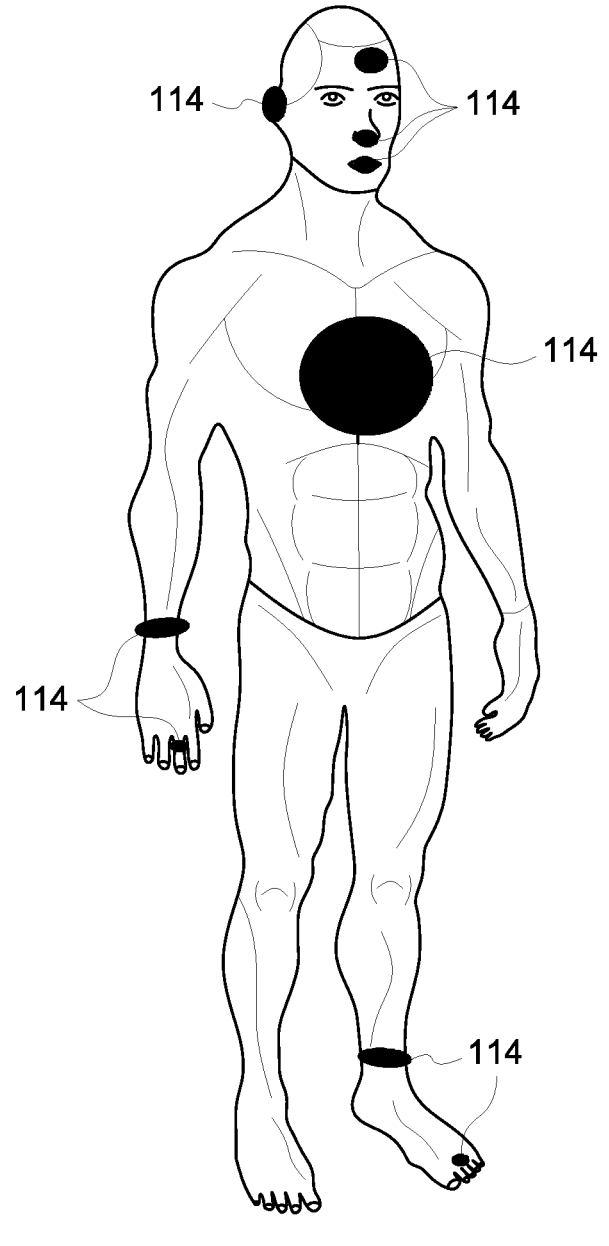
FIG. 2 illustrates example positions of a wearable sensor system in accordance with one embodiment.

In one or more embodiments, the sensor system 100 may be a handheld sensor system. In one or more embodiments, the sensor system 100 may be a wearable sensor system, may be held within a wearable and/or non-wearable transferrable object (e.g., a frame of military or industrial eyeglasses), or the like. The wearable device may be worn by a subject, such as a human or animal, may be removably coupled or integrated with an article worn by a subject (e.g., a shirt, pants, safety vest, safety personal protection clothing, eyeglasses, hat, helmet, hearing device, or the like), or may be any alternative device that may be transferrable such that sensor can be moved between different positions, may be stationary or substantially stationary, or the like. FIG. 2 illustrates example positions of different wearable sensors 114. In the illustrated embodiment of FIG. 2, the subject is a human subject, however the subject may be a mammal subject, a plant subject, or the like.

Figure 3:
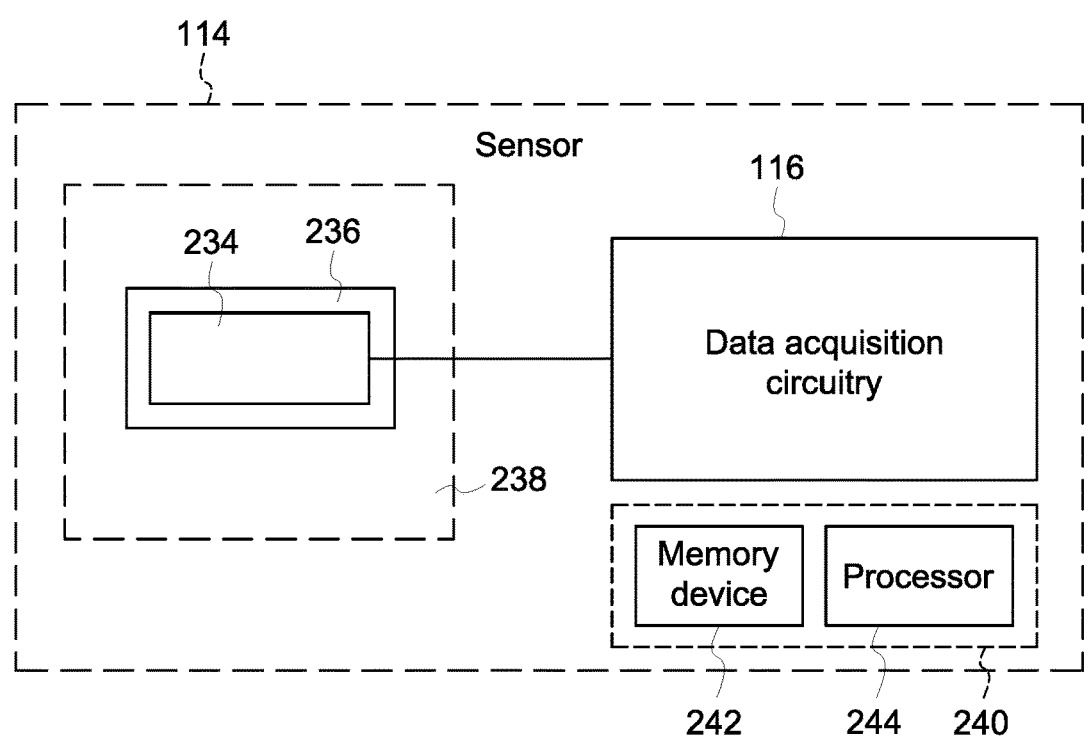
FIG. 3 illustrates a non-limiting example of a design of a sensor shown in FIG. 1 in accordance with one embodiment.

FIG. 3 illustrates a non-limiting example of a design of the sensor 114. A sensing electrode structure 234 of the sensor 114 may be connected to the data acquisition circuitry 116. The sensing electrode structure 234 may be coated with a sensing film 236 (or sensing material). The sensing electrode structure 234, with the sensing film 236, form a sensing element 238. The sensing electrode structure 234, with the sensing film 236 that forms the sensing element 238, may operationally contact a fluid. The fluid contains the one or more analyte gases therein.

Suitable interdigital electrode structures for probing a fluid sample include two- and four-electrode structures. Suitable materials for electrodes include stainless steel, platinum, gold, noble metals, and others. Suitable materials of a substrate may include silicon dioxide, silicon nitride, alumina, ceramics, and others. Suitable examples of sensing materials or sensing films include a metal oxide material, a metal oxide semiconducting material, a composite material, semiconducting materials, n-type semiconducting materials, p-type semiconducting materials, nanocomposite materials, inorganic materials, organic materials, polymeric materials, formulated materials, any known sensing material, or the like.

Suitable electrodes may be formed using metal etching, screen-printing, ink-jet-printing, and mask-based metal deposition techniques. The thickness of fabricated electrodes on the substrates may be in the range from about 10 nanometers to about 1,000 micrometers. The materials for the interdigital electrode structures, substrate, sensing layer, and electrode formation methods may be selected based at least in part on the application specific parameters.

In the depicted embodiment, the sensor 114 may also include a selector 240 including a memory device 242 and a processor 244. In some embodiments, the memory device 242 may include excitation parameters for providing the stimuli to the sensing electrode structure 234 and/or the sensing film 236. In some cases, the processor 244 may reference the memory device 242 to determine the excitation parameters for providing each stimulus to the sensing element 238 with a different excitation frequency. In such cases, the processor 244 may provide one or more control signals based on retrieving the excitation parameters.

For example, the processor 244 may provide the one or more control signals to an excitation circuit of the sensor 114 to generate the stimuli with different excitation frequencies (or to perform a frequency sweep). Moreover, the excitation circuit of the sensor 114 may apply the stimuli to the sensing electrode structure 234, the sensing film 236, or both. The sensing element 238 may provide a response signal based on receiving each of the stimulus signals and based on exposure to one or more analyte gases in proximity/contact of the sensing element 238. A sensitivity of the sensing element 238 to different concentrations of different analyte gases may vary based on receiving the stimuli with different excitation frequencies.

Moreover, an impedance analyzer of the sensor 114 may receive the response signals. If not compensated for, the response signals may include noise from environmental or electrical sources and/or may exhibit drift based on various variables such as ambient or environmental conditions at the sensor 114. In some embodiments, the impedance analyzer of the sensor 114 may analyze the response signals to reduce the baseline drift (e.g., baseline impedance drift) or noise of the response signals, as discussed in more details below.

In some embodiments, the processor 244 may include such an impedance analyzer. Alternatively or additionally, the impedance analyzer may be implemented separately from the processor 244 and may provide analyzed response signals or an indication of the baseline drift or noise of the response signals to the processor 244. Some embodiments associated with the impedance analyzer and the excitation circuit are described in more details below. Moreover, it should be appreciated that although the selector 240, including the memory device 242 and the processor 244, is shown as part of the sensor 114, in different embodiments the controller 122 (shown in FIG. 1) may include the memory device 242 and/or the processor 244. Alternatively or additionally, the memory device 242, the processor 244, or both may be implemented as standalone components.

Figure 4:
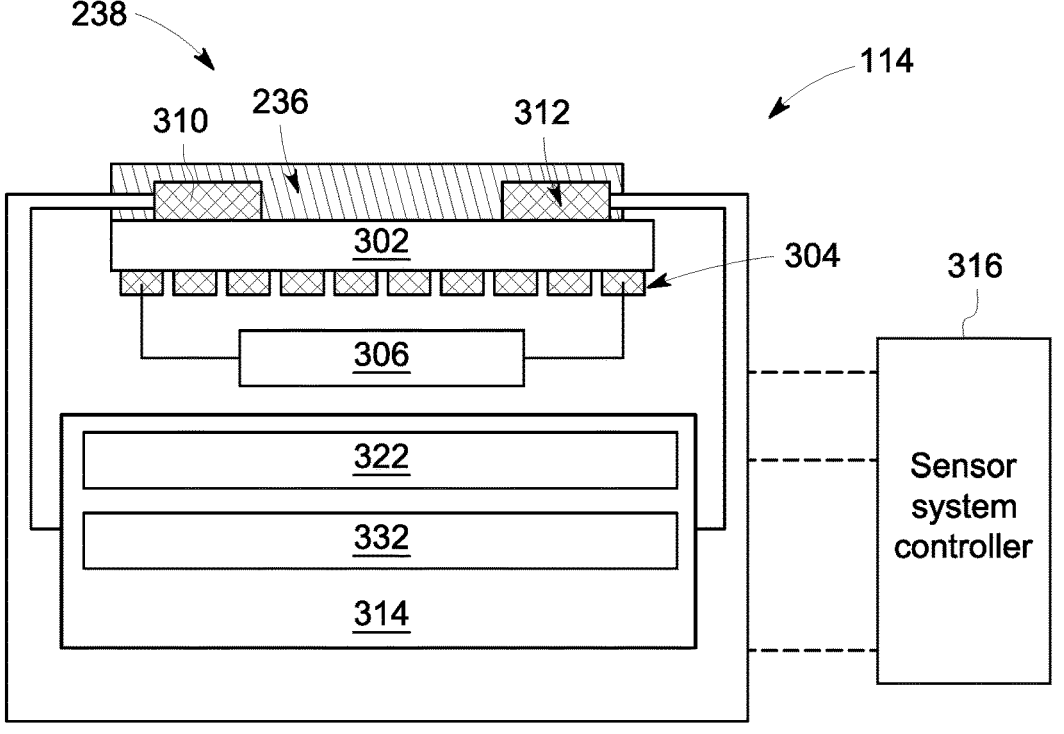
FIG. 4 illustrates one implementation of a sensor in accordance with one embodiment.

FIG. 4 illustrates one embodiment of the multivariable gas sensor 114. The sensor 114 includes a sensing element 238 having a substrate 302, such as a dielectric material, the sensing film or sensing material 236 that is coupled to the substrate 302, and electrodes 310 and 312. The sensing film 236 is exposed to, in contact with, in indirect contact with, or the like, at least one analyte gas.

In some cases, one or several heating elements 304, such as high resistance bodies, are coupled to different sides of the substrate 302 relative to the sensing film 236. The heating elements 304 receive electric current from a heater controller 306, which represents hardware circuitry that conducts the heater current or voltage to the heating elements 304 to heat the substrate 302 and to heat the sensing film or sensing film 236 that is coupled to another side of the substrate 302.

In one or more embodiments of the subject matter described herein, the sensing film 236 may include MOS material. The sensing film 236 can include one or more materials deposited onto the substrate 302 to perform a function of predictably and reproducibly affecting the impedance sensor response upon interaction with the environment. For example, a metal oxide semiconductor material, such as $SnO_2$, may be deposited as the sensing film 236. Other examples of MOS materials include single-metal oxides (e.g., ZnO, CuO, CoO, SnO2, TiO2, ZrO2, CeO2, WO3, MoO3, In2O3), perovskite oxides structures with two differently sized cations (e.g., SrTiO3, CaTiO3, BaTiO3, LaFeO3, LaCoO3, SmFeO3), and mixed metal oxide compositions (e.g., CuO BaTiO3, ZnO WO3, SnO2 TiO2).

The sensing electrodes 310 and 312 are coupled with and/or disposed on or in the sensing film 236 and are connected with the substrate 302 in the illustrated embodiment. The sensing electrodes 310 and 312 are conductive bodies that are conductively coupled to an excitation/detection circuit 314. In some embodiments, the impedance analyzer 332 may include a frequency impedance source and detector system. For example, the excitation/detection circuit 314 may include an excitation circuit 322 including the frequency impedance source and an impedance analyzer 332 including the detector system. Alternatively or additionally, the impedance analyzer 332 may include circuitry to convey received signals form the sensing electrodes 310 and 312 to a sensor system controller 316 for processing. In any case, in the illustrated embodiment, the sensing electrodes 310 and 312 may be directly and independently conductively coupled to the excitation/detection circuit 314. Alternatively, the sensing electrodes 310 and 312 may not be conductively coupled (e.g., indirectly coupled) to one of the excitation circuit 322 and/or the impedance analyzer 332.

In some embodiments, the sensor 114 may include the sensor system controller 316. In alternative or additional embodiments, the sensor system controller 316 may be disposed outside the sensor 114 operably coupled with the sensor 114. For example, the sensor system controller 316 may be coupled to the excitation/detection circuit 314 and the heater controller 306. The sensor system controller 316 may include one or more processing circuits including one or more processors, microprocessors, field programmable gate arrays, and/or integrated circuits. For example, the sensor system controller 316 may include at least a portion of the processor 244 and/or the controller 122 discussed above.

In some cases, the sensor system controller 316 may include one or multiple processing units each performing one or more functions to analyze a group of multiple response signals and determine the adjusted response signals. For example, the sensor system controller 316 may include a processor unit for gathering the multiple response signals over a range of excitation frequencies. The processor unit may determine (e.g., unmix) effects of the analyte gas and variable ambient conditions to facilitate reducing baseline drift and noises caused by the variable ambient conditions. The processor unit or a different processor unit may determine and apply correction values to provide the adjusted response signals. Moreover, one of the processor units discussed above or a separate processor unit may also consider timing (or a time constant) associated with detected events, baseline drift changes, and gas mixtures variations.

The sensor system controller 316 may provide one or more control signals to the excitation/detection circuit 314 by controlling the excitation circuit 322. The sensor system controller 316 may provide the one or more control signals to apply the electrical or electromagnetic stimuli at a single or discrete excitation frequency, or at a pre-determined range of varying excitation frequencies, for interrogation of the sensing material or sensing film 236. The sensor system controller 316 may also control an integration time to apply the electrical or electromagnetic stimuli for measuring the sensor response at each excitation frequency. The sensor system controller 316 may include one or multiple processing units each performing one or more functions to provide the one or more control signals and/or measure the sensor response.

The excitation circuit 322 of the excitation/detection circuit 314 may include circuitry to generate one or more excitation signals or stimulus signals to interrogate the sensing film 236. For example, the excitation circuit 322 may generate the stimulus signal based on the one or more control signals indicative of an excitation frequency, integration time, and/or an amplitude of the stimulus signal from the selector 240. The excitation circuit 322 may provide the stimuli to the sensing electrodes 310 and 312 and thereby to the sensing film 236.

Moreover, the stimulated electrodes 310 and 312 and the sensing film 236 may provide one or more response signals based on receiving the stimuli and exposure to one or more analyte gases. In some cases, the excitation circuit 322 may apply multiple stimuli each having a different excitation frequency (e.g., apply a frequency sweep) based on receiving one or more control signals. For example, the excitation circuit 322 may receive the one or more control signals from the processor 244 of the sensor 114 discussed with respect to FIG. 3, the controller 122 associated with the sensor 114 discussed with respect to FIG. 1, among other things.

In some cases, the excitation circuit 322 and/or the impedance analyzer 332 may include processing circuitry that include one or more microprocessors, field programmable gate arrays, and/or integrated circuits. In alternative embodiments, the impedance analyzer 332 may include common and/or unique integrated circuits and/or circuitry that allows the system to operate as either an impedance system and/or a resistance detector system. Additionally or alternatively, the impedance analyzer 332 may include common and/or unique integrated circuits and/or circuitry to provide and/or convey the received signals to the sensor system controller 316 for processing. For example, the impedance analyzer 332 may include at least a portion of the processor 244 and/or the controller 122 discussed above. In any case, the impedance analyzer 332 may receive an electrical signal from the sensing electrodes 310 and 312 that represents the electrical impedance or impedance response of the sensing element 238 during exposure of the sensing film 236 to the fluid sample.

In some embodiments, the sensor system controller 316 may examine the received signals, as described herein. For example, the excitation/detection circuit 314 may provide scanning capability to measure sensor impedance responses at a single or at plural discrete excitation frequencies. Alternatively, the excitation/detection circuit 314 may interrogate the sensor 114 to measure sensor impedance responses across an excitation frequency range. As such, the received signals may each have a different excitation frequency based on the excitation frequency of the stimuli.

Accordingly, the sensor system controller 316 may determine and analyze impedance variations of the signals provided to the sensing element 238 across a range of excitation frequencies. That is, the sensor system controller 316 may examine the electrical impedance of the sensing element 238 in order to determine the presence and/or amount (e.g., concentration) of one or more analyte gases in the environment to which the sensing film 236 is exposed. In any case, the sensor system controller 316, the processor 244, the controller 122 (discussed above), or a combination thereof may receive and analyze the signals by utilizing a multivariate curve resolution (MCR) technique. MCR technique may include a modelling method for analysis of data from the first, second, and higher order analytical instruments such as the sensor 114. Accordingly, the sensor 114 may analyze a group of multiple response signals to provide or generate analyzed response signals with reduced noise and/or baseline drift (e.g., adjusted response signals).

Moreover, in alternative or additional embodiments, the excitation circuit 322 may provide the stimuli over different ranges of additional variables. Such additional variables may include temperature, resistance, impedance, voltage, among other things, and/or combinations thereof. For example, the sensor system controller 316 may additionally provide one or more control signals to the heater controller 306 to control the heating elements 304 to provide the stimuli over a range of temperatures. In such embodiments, the impedance analyzer 332 may receive and analyze the response signals based on the range of excitation frequencies and the additional variables (e.g., differing temperatures). Accordingly, the sensor 114 may include circuitry to analyze one or more analyte gases based on performing a first order measurement (e.g., sweeping excitation frequency), a second order measurement based on a range of excitation frequencies and one additional independent variable, a third order measurement based on a range of excitation frequencies and two additional independent variables, and so on.

Figure 5:
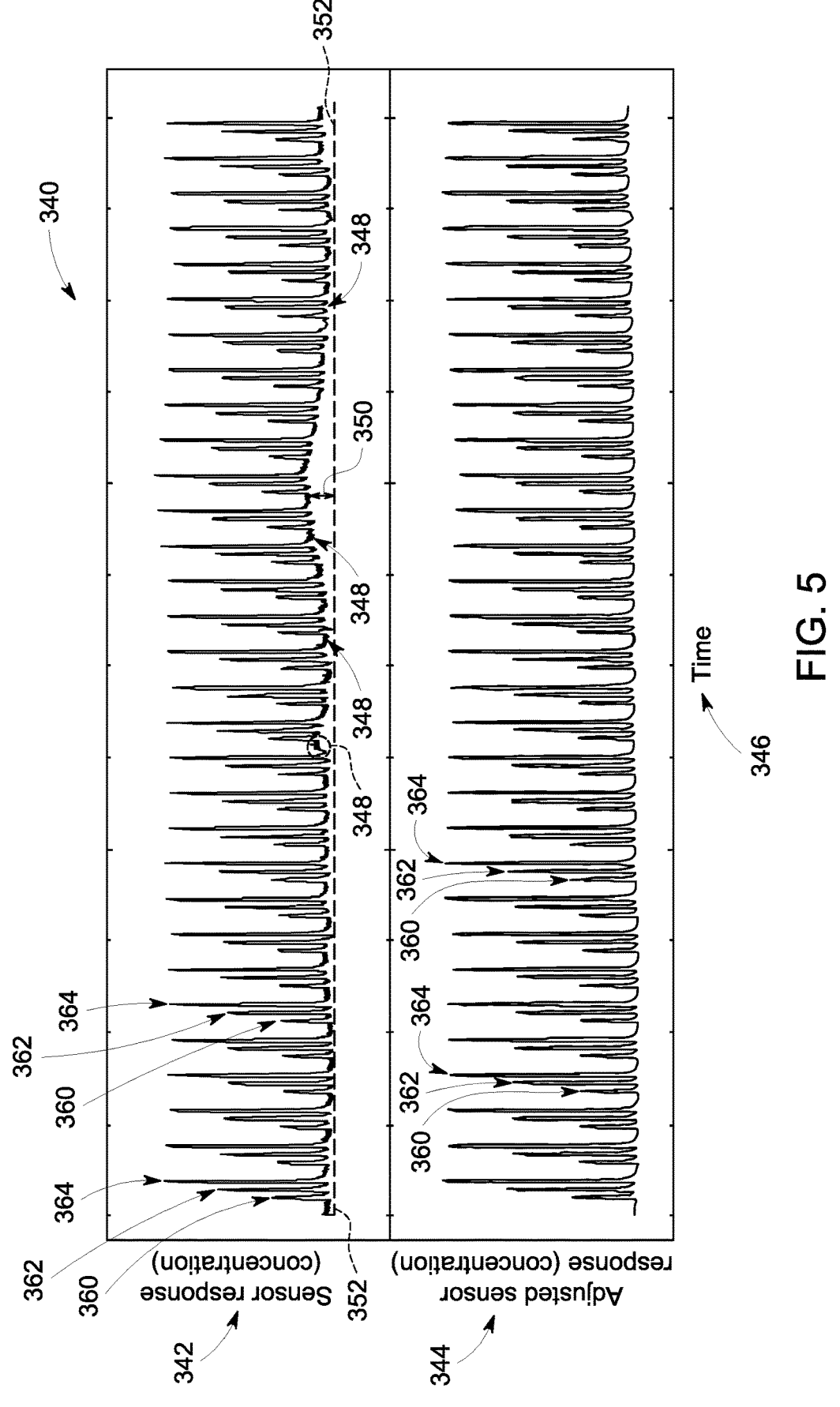
FIG. 5 illustrates a graph depicting response signals and adjusted response signals in accordance with one embodiment.

With the foregoing in mind, FIG. 5 illustrates a graph 340 depicting response signals 342 and adjusted response signals 344. For example, the excitation circuit 322 may generate stimulus signals over a range of excitation frequencies over time 346. For example, the excitation circuit 322 may generate the stimulus signals over the range of excitation frequencies from 10 kHz to 200 kHz. Steps 360, 362 and 364 are replicate responses of the sensor to three concentrations of NO2 that are 80, 160, and 240 parts per billion (ppb) collected over time (e.g., 45 hours of testing).

The impedance analyzer 332 discussed above may receive the response signals 342 including noise 348 (e.g., noise effect) and baseline drift 350. The noise 348 may be generated by various variables such as non-ideal components, ambient conditions of the analyte gas and/or components of the sensor 114, among other things. The baseline drift 350 may be caused by similar or different various variables at an instance or over time. In some cases, the baseline drift 350 may be measured with respect to a baseline 352. For example, the baseline drift 350 between the response signals 342 and the baseline 352 may vary over time. The baseline drift 350 may be measured based on receiving first order measurements, second order measurements, or so on, response signals 342 using various techniques such as the MCR technique. In any case, the baseline drift 350 may consistently shift values of the response signals 342 in a respective direction while noise 348 may cause fluctuation and/or random variations in the response signals 342. For example, the baseline drift 350 and/or the noise 348 are measured based on differences in measurements compared to when the sensing element 238 is in contact with a clean carrier gas.

In any case, the adjusted response signals 344 may include reduced noise and/or baseline drift relative to the measured response signals 342. In some cases, the impedance analyzer 332 may include processing circuitry such as at least a portion of the sensor system controller 316, the processor 244, and/or the controller 122 discussed above. Alternatively or additionally, the impedance analyzer 332 may receive one or more control signals to perform operations. The operations may include receiving the response signals 342, determining a value of the noise 348, the baseline drift 350, or both, determining noise reduction values and/or baseline correction values, and reducing the noise 348 and/or the baseline drift 350 by the noise reduction values and/or baseline correction values to provide the adjusted response signals 344. In any case, the adjusted response signals 344 may include reduced noise and/or baseline drift relative to the measured response signals 342 based on applying the MCR technique. Moreover, the MCR technique may be used based on providing the stimulus signals and receiving the response signals over the range of excitation frequencies.

FIG. 6 is a process 380 for improving baseline stability and reducing noise of the sensor 114 discussed above, this improving accuracy of sensor performance. The process 380 may be performed by a controller such as the excitation circuit 322 and the impedance analyzer 332, the controller 122, the processor 244, the sensor system controller 316, or any other viable processing circuit. Moreover, in some embodiments, a tangible and non-transitory computer readable storage medium, such as the memory 242 may store and provide at least a portion of the instructions for performing the functions described herein. It should be appreciated that the process blocks described are by the way of example, and in alternative or additional embodiments, additional or reduced process blocks may be performed. Moreover, although the process blocks are described in a particular order, in alternative or additional embodiments, the process blocks may be performed in a different order.

At block 382, the controller may provide multiple signals having different frequencies to the sensing element. For example, the signals may include electrical and/or electromagnetic signals. In some cases, the controller may provide the signals with frequencies within a frequency range to perform a frequency sweep operation based on the frequency range. In some cases, the controller may provide the signals with frequencies within a frequency range to perform steps across a range of frequencies where the steps can have same widths or different widths within the frequency range. In different embodiments, the frequency range may be different based on various variables such as type of the sensing material 236, the analyte gas of interest, amplitude and/or integration time of the signals, among other things.

At block 384, the controller may receive response signals 342 from the sensing element 384. In some cases, the controller may store the response signals 342 in a memory device such as the memory device 242. At block 386, the controller may determine one or more baseline drift values (e.g., the baseline drift 350), one or more sensor response noise values (e.g., the noises 348), or both. The controller may execute one or more processor-executable routine, such as routines for performing a multivariate curve resolution technique to the multiple response signals to determine the baseline drift values, the sensor response noise values, or both. Noise values may include random short-term fluctuations of responses (e.g., measurements) of the sensor 114 when the sensing element 384 is in contact with a clean carrier gas. The short-term fluctuations are fluctuations between adjacent (or consecutive) readings of the sensor 114.

At block 388, the controller may determine one or more baseline correction values, one or more response noise reduction values, or both. At block 390, the controller may reduce the one or more baseline drift values, the one or more sensor response noise values, or both. The controller may determine the one or more baseline correction values based on the one or more baseline drift values and the one or more baseline correction values. Moreover, the controller may determine the one or more sensor response noise values based on the sensor response noise values and the one or more response noise reduction values.

Figure 7:
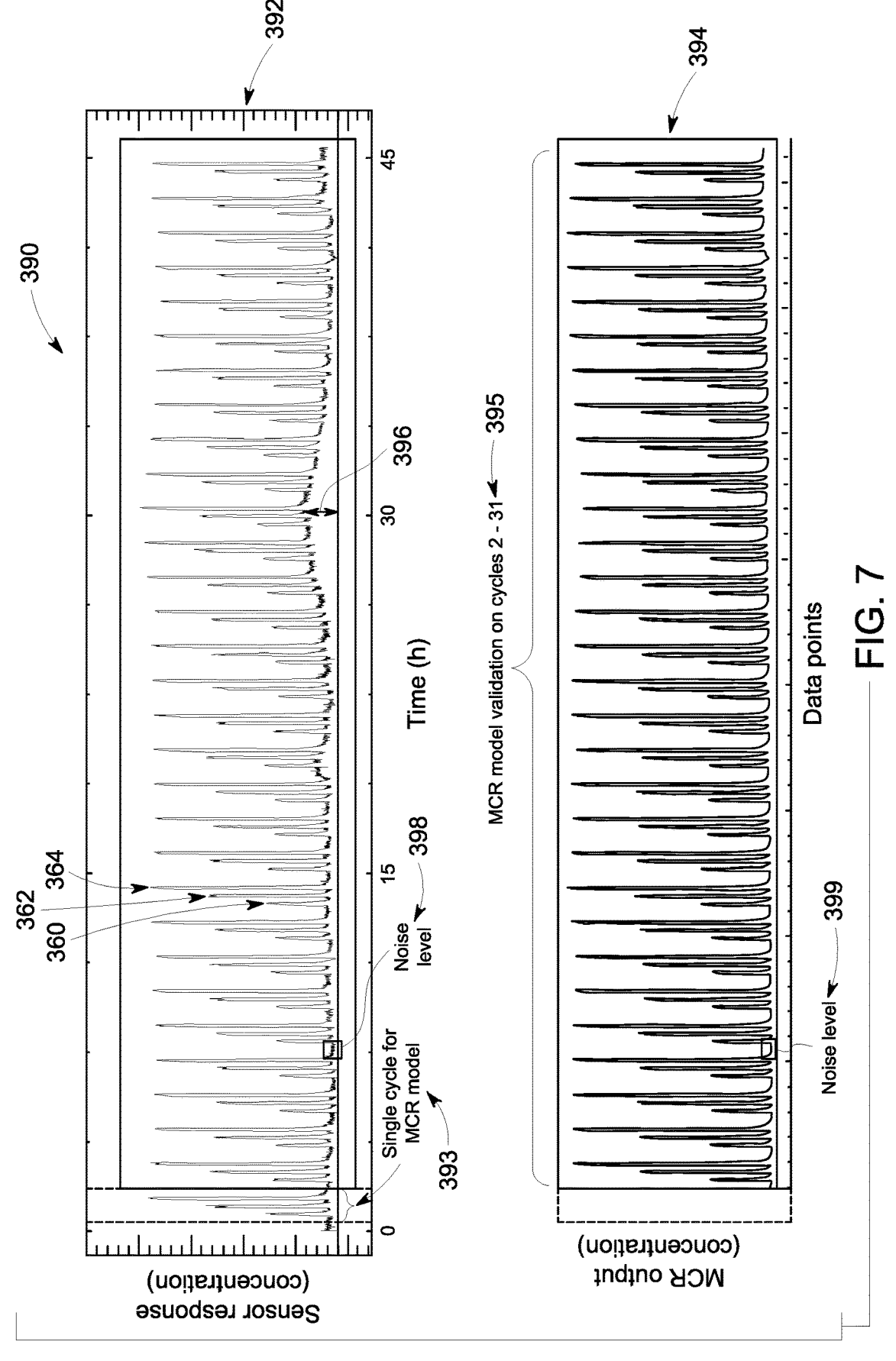
FIG. 7 illustrates a graph depicting response signals and adjusted response signals improved by a desired limit of detection (LOD) based on applying a multivariate curve resolution technique in accordance with one embodiment.

FIG. 7 illustrates a graph 390 depicting response signals 392 and adjusted response signals 394 in accordance with one embodiment. The graph 390 depicts results of applying the MCR technique for correction of the baseline drift 396 and reduction of baseline noise 398 of the sensor 114 (e.g., a first-order sensing element) by dielectric excitation as described above. As shown in the depicted example, the sensor 114 may apply the MCR technique to the response signals 392 after a first measurement cycle 393. For example, the response signals 392 depict raw response of the sensor 114 based on providing each measurement cycle by providing excitation signals to the sensor and observing sensor responses 360, 362, and 364 to three concentrations of NO2 gas of 80, 160, and 240 ppb over time as discussed above. Moreover, the sensor 114 may be performing configuration setups or any form initialization based on the first measurement cycle 393. Accordingly, the sensor 114 may apply the MCR technique to the response signals 392 during measurement cycles 395 subsequent to the first measurement cycle 393. For example, the sensor 114 may be exposed to a fluid such as NO2.

As mentioned above, the MCR technique may include a modelling method for analysis of data from the first, second, and higher order analytical instruments (e.g., the sensor 114). In the case of a first order sensor 114, the MCR technique may be described with equation 1:

$$D = CS^T + E \qquad \text{(Equation 1)}$$

In the equation 1, D is multi-frequency impedance data received or determined by the sensor 114 over time. The sensor 114 may provide the value of D upon exposures to various gas (or fluid) concentrations. In some cases, the senor 114 may provide D as a data matrix with m×n data size where m is the number of recorded multi-frequency impedance data (e.g., impedance spectra) and n is the number of frequencies in the multi-frequency impedance data of the sensor. C may include a matrix of m×k data where its columns contain responses of pure components as a function of time during the transformation. The pure components may include a group of features that may vary based on a pattern (e.g., time). For example, the impedance data coming from the multi-frequency impedance response of the sensor may not have a pattern. S may include a matrix of n×k data that contains the columns of the respective multi-frequency impedance spectra of the pure components. T may include a mathematical transpose operator. Moreover, E may include a residual error versus D (e.g., the raw multi-frequency impedance spectra) that may account for error and/or unaccounted factors by the model.

Moreover, the sensor 114 (the impedance analyzer 332, the controller 122, the processor 244, the sensor system controller 316, or any other viable processing circuit discussed above) may determine the adjusted response signals 394 with reduced noise 399 by applying the MCR technique to the response signals 392. The baseline drift 396 may be reduced by applying the MCR technique to the response signals 392.

Figure 8:
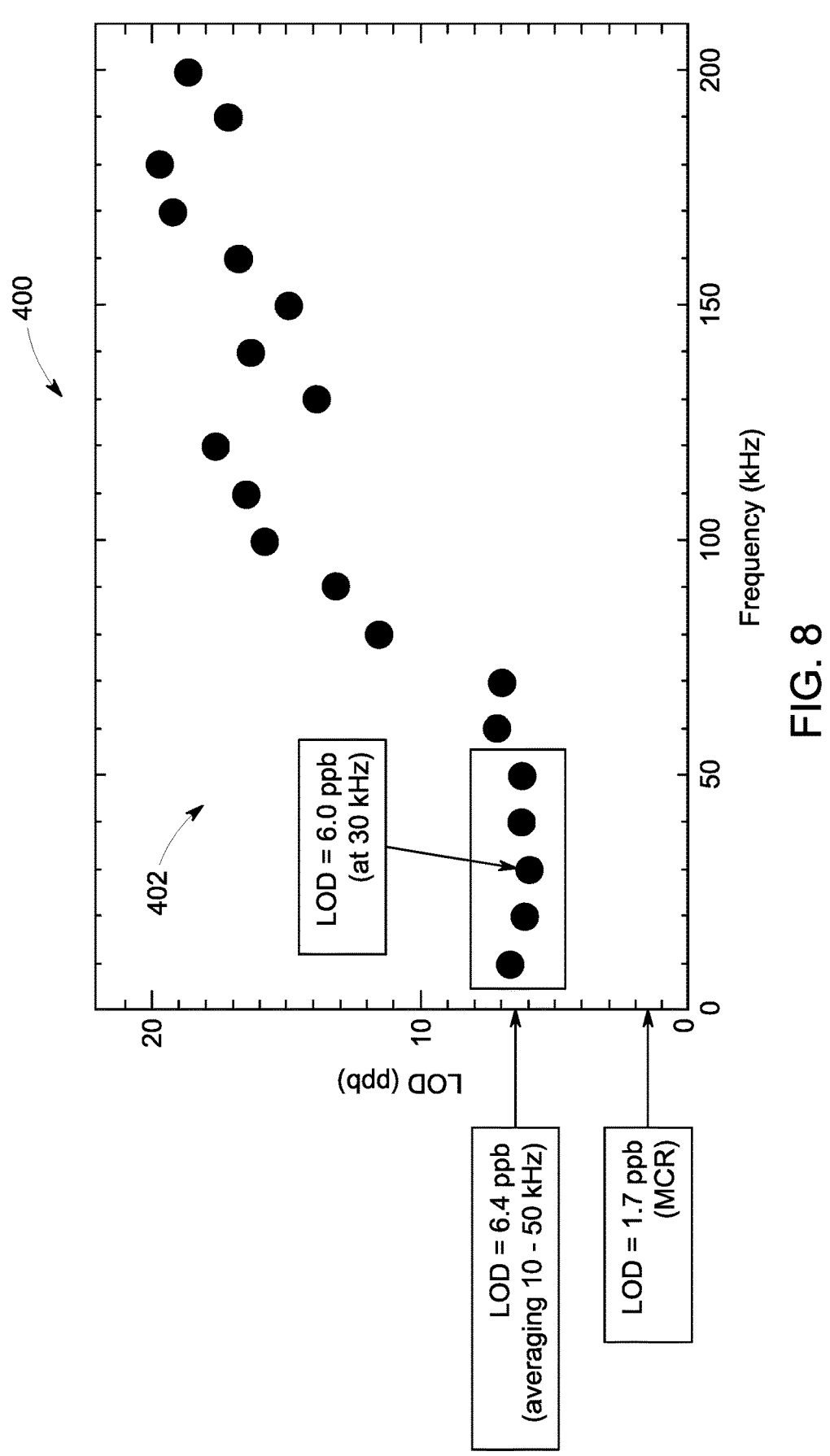
FIG. 8 illustrates a graph illustrating example results when determining limit of detection (LOD) of the sensor in accordance with one embodiment.

FIG. 8 depicts a graph 400 illustrating non-limiting example results when determining limit of detection (LOD) of the sensor 114. In the non-limiting example of FIG. 8, LOD results 402 are determined based on the adjusted response signals 394 discussed above based on applying the MCR technique to the response signals 392. In one non-limiting example, the LOD results 402 may be determined at 30 kHz (LOD=6 ppb). For example, the LOD results 402 may not improve by a desired margin (e.g., based on a threshold) by averaging of the response signals 392 of the sensor 114 at neighbor frequencies of 10-50 kHz (LOD=6.4 ppb). In such cases, LOD value may improve based on the desired threshold by applying the MCR algorithms (e.g., by a factor of 3.5-3.75). In the depicted embodiment, the LOD value may be improved (e.g., reduced) to a desired LOD value (e.g., 1.7 ppb of NO2 detection) by applying the MCR technique to the response signals 392.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising," "including," or "having" (or like terms) an element, which has a particular property or a plurality of elements with a particular property, may include additional such elements that do not have the particular property.

As used herein, terms such as "system" or "controller" may include hardware and/or software that operate(s) to perform one or more functions. For example, a system or controller may include a computer processor or other logic-based device that performs operations based on instructions stored on a tangible and non-transitory computer readable storage medium, such as a computer memory. Alternatively, a system or controller may include a hard-wired device that performs operations based on hard-wired logic of the device. The systems and controllers shown in the figures may represent the hardware that operates based on software or hardwired instructions, the software that directs hardware to perform the operations, or a combination thereof.

As used herein, terms such as "operably connected," "operatively connected," "operably coupled," "operatively coupled," "operationally contacted," "operational contact" and the like indicate that two or more components are connected in a manner that enables or allows at least one of the components to carry out a designated function. For example, when two or more components are operably connected, one or more connections (electrical and/or wireless connections) may exist that allow the components to communicate with each other, that allow one component to control another component, that allow each component to control the other component, and/or that enable at least one of the components to operate in a designated manner.

It is to be understood that the subject matter described herein is not limited in its application to the details of construction and the arrangement of elements set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the presently described subject matter without departing from its scope. While the dimensions, types of materials and coatings described herein are intended to define the parameters of the disclosed subject matter, they are by no means limiting and are exemplary embodiments. Many other embodiments will be apparent to one of ordinary skill in the art upon reviewing the above description.

The scope of the subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the present subject matter, and also to enable one of ordinary skill in the art to practice the embodiments of the disclosed subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A sensor system comprising:
a sensing element configured to receive a plurality of stimulus signals across a frequency range;
a controller configured to provide one or more control signals to monitor at least one component in a fluid;
an excitation/detection system coupled to the sensing element and the controller, wherein the excitation/ detection system is configured to perform one or more operations based on the one or more control signals, wherein the one or more operations comprise:
providing the plurality of stimulus signals to the sensing element, wherein the excitation/detection system is configured to provide each stimulus signal of the plurality of stimulus signals with a different frequency within the frequency range to the sensing element, wherein the plurality of stimulus signals comprise:
a first stimulus signal at a first frequency;
a second stimulus signal at a second frequency, wherein the second frequency is separated from the first frequency by a first step width; and
a third stimulus signal at a third frequency, wherein the third frequency is separated from the second frequency by a second step width;
wherein the first stimulus signal, the second stimulus signal, and the third stimulus signal make up at least a portion of a frequency sweep operation across the frequency range, and wherein the first step width and the second step width are based on a type of sensing material of the sensing element, a type of the fluid, or a combination thereof;
receiving a plurality of sensor responses from the sensing element in response to providing the plurality of stimulus signals;
determining one or more noise values, one or more baseline drift values, or both based on analyzing the plurality of sensor responses, wherein analyzing the plurality of sensor responses comprises applying a multivariate curve resolution algorithm configured to reduce the one or more noise values, the one or more baseline drift values, or both;
determining at least one noise reduction value, at least one baseline drift reduction value, or both; and
reducing at least one noise value of the one or more noise values based on the at least one noise reduction value, at least one baseline drift value of the one or more baseline drift values based on the at least one baseline drift reduction value, or both.

2. The sensor system of claim 1, wherein analyzing the plurality of sensor responses comprises applying an analysis of the plurality of stimulus signals with a different frequency within the frequency range to the sensing element over a radio-frequency range of an electromagnetic spectrum.

3. The sensor system of claim 1, wherein the one or more operations comprise analyzing the plurality of sensor responses by applying an additional multivariate curve resolution algorithm.

4. The sensor system of claim 1, wherein the sensor system comprises a first order, a second order, or a higher order sensor.

5. The sensor system of claim 1, wherein the plurality of sensor responses comprises impedance measurements of the sensing element based on providing the plurality of stimulus signals.

6. The sensor system of claim 1, wherein the one or more baseline drift values comprise a drift from a baseline value of a sensor response of the plurality of sensor responses when the sensing element is in contact with a clean carrier gas.

7. The sensor system of claim 1, wherein the one or more noise values comprise fluctuations of the plurality of sensor responses when the sensing element is in contact with a clean carrier gas.

8. The sensor system of claim 1, wherein the sensor system is configured to continuously monitor a concentration of the at least one component in the fluid.

9. The sensor system of claim 1, wherein the sensor system comprises a first order sensor that is configured to utilize a metal oxide-semiconductor (MOS) material that is interrogated with an impedance excitation/detection circuit.

10. A method, comprising:

providing, by a controller of a sensor system, one or more control signals to cause generation of a plurality of stimulus signals, each with a different frequency, to a sensing element of the sensor system, wherein the sensing element is configured to receive the plurality of stimulus signals across a frequency range, wherein the plurality of stimulus signals comprise:

a first stimulus signal at a first frequency;

a second stimulus signal at a second frequency, wherein the second frequency is separated from the first frequency by a first step width; and a third stimulus signal at a third frequency, wherein the third frequency is separated from the second frequency by a second step width;

wherein the first stimulus signal, the second stimulus signal, and the third stimulus signal make up at least a portion of a frequency sweep operation across the frequency range, and wherein the first step width and the second step width are based on a type of sensing material of the sensing element, a type of fluid, or a combination thereof;

receiving, by the controller, a plurality of sensor responses from the sensing element in response to providing the plurality of stimulus signals;

determining, by the controller, one or more noise values, one or more baseline drift values, or both based on analyzing the plurality of sensor responses, wherein analyzing the plurality of sensor responses comprises applying a multivariate curve resolution algorithm configured to reduce the one or more noise values, the one or more baseline drift values, or both;

determining, by the controller, at least one noise reduction value, at least one baseline drift reduction value, or both; and reducing, by the controller, at least one noise value of the one or more noise values based on the at least one noise reduction value, at least one baseline drift value of the one or more baseline drift values based on the at least one baseline drift reduction value, or both.

11. The method of claim 10, comprising analyzing the plurality of sensor responses by applying an additional multivariate curve resolution algorithm.

12. The method of claim 10, comprising analyzing, by a first order, a second order, or a higher order sensor, the plurality of sensor responses.

13. The method of claim 10, wherein the plurality of sensor responses comprises impedance measured results of the sensing element based on providing the plurality of stimulus signals.

14. The method of claim 10, wherein the one or more baseline drift values comprise a drift from a baseline value of a sensor response of the plurality of sensor responses when the sensing element is in contact with a clean carrier gas and the one or more noise values comprise fluctuations of the plurality of sensor responses when the sensing element is in contact with the clean carrier gas.

15. A non-transitory computer-readable medium comprising computer-executable instructions that, when executed, are configured to cause a processor to:

provide one or more control signals to an excitation circuit of a sensor system to generate a plurality of stimulus signals, each with a different frequency, to a sensing element of the sensor system, wherein the sensing element is configured to receive the plurality of stimulus signals across a frequency range, wherein the plurality of stimulus signals comprise:

a first stimulus signal at a first frequency;

a second stimulus signal at a second frequency, wherein the second frequency is separated from the first frequency by a first step width; and a third stimulus signal at a third frequency, wherein the third frequency is separated from the second frequency by a second step width;

wherein the first stimulus signal, the second stimulus signal, and the third stimulus signal make up at least a portion of a frequency sweep operation across the frequency range, and wherein the first step width and the second step width are based on a type of sensing material of the sensing element, a type of fluid, or a combination thereof;

receive a plurality of sensor responses from the sensing element in response to providing the plurality of stimulus signals;

determine one or more noise values, one or more baseline drift values, or both based on analyzing the plurality of sensor responses, wherein analyzing the plurality of sensor responses comprises applying a multivariate curve resolution algorithm configured to reduce the one or more noise values, the one or more baseline drift values, or both;

determine at least one noise reduction value, at least one baseline drift reduction value, or both; and reduce at least one noise value of the one or more noise values based on the at least one noise reduction value, at least one baseline drift value of the one or more baseline drift values based on the at least one baseline drift reduction value, or both.

16. The non-transitory computer-readable medium of claim 15, wherein the computer-executable instructions that, when executed, are configured to cause the processor to analyze the plurality of sensor responses by applying an additional multivariate curve resolution algorithm.

17. The non-transitory computer-readable medium of claim 15, wherein the sensor system is a first order, a second order, or a higher order analytical instrument to analyze the plurality of sensor responses.

18. The non-transitory computer-readable medium of claim 15, wherein the plurality of sensor responses comprises impedance measurements of the sensing element based on providing the plurality of stimulus signals.

19. The non-transitory computer-readable medium of claim 15, wherein the one or more baseline drift values comprise a drift from a baseline value of a sensor response of the plurality of sensor responses when the sensing element is in contact with a clean carrier gas and the one or more noise values comprise fluctuations of the plurality of sensor responses when the sensing element is in contact with the clean carrier gas.

20. The non-transitory computer-readable medium of claim 15, wherein the processor is configured to continuously monitor a concentration of at least one component in a fluid.

* * * * *